United States Patent
Sikchi et al.

(10) Patent No.: US 7,437,376 B2
(45) Date of Patent: Oct. 14, 2008

(54) SCALABLE OBJECT MODEL

(75) Inventors: Prakash Sikchi, Issaquah, WA (US);
Brian G. O'Connor, Seattle, WA (US);
Claudio Caldato, Redmond, WA (US);
Silviu Ifrim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/018,024

(22) Filed: Dec. 20, 2004

(65) Prior Publication Data
US 2006/0136355 A1 Jun. 22, 2006

(51) Int. Cl.
*G06F 17/00* (2006.01)
*G06F 3/00* (2006.01)

(52) U.S. Cl. ...................... 707/101; 715/751

(58) Field of Classification Search .. 707/103 R–103 Y, 707/101; 715/700, 751, 727, 234; 709/204, 709/227
See application file for complete search history.

(56) References Cited

U.S. PATENT DOCUMENTS

| | | | |
|---|---|---|---|
| 4,201,978 A | 5/1980 | Nally |
| 4,498,147 A | 2/1985 | Agnew et al. |
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |

(Continued)

FOREIGN PATENT DOCUMENTS

EP 0841615 11/1999

(Continued)

OTHER PUBLICATIONS

Microsoft Corporation, "Microsoft Computer Dictionary" Microsoft Press, Fifth Edition, p. 149.

(Continued)

*Primary Examiner*—Don Wong
*Assistant Examiner*—Angela M Lie (57) ABSTRACT

Scalable object model design is described. In an embodiment, one or more objects corresponding to a form are instantiated in response to a request for the form from a first client device, and an events manager is instantiated through which the one or more objects register to process data manipulation events associated with the form. Data specific to the first client device is processed with the one or more objects that correspond to the form via a first processor thread. An additional request from a second client device is received and additional data specific to the second client device is processed with the one or more objects that correspond to the form via a second processor thread. The one or more objects are shared by the first client device and the second client device to process the data manipulation events associated with the form.

20 Claims, 5 Drawing Sheets

U.S. PATENT DOCUMENTS

| | | |
|---|---|---|
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |

| Patent | Kind | Date | Inventor |
|---|---|---|---|
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,088,708 | A | 7/2000 | Burch et al. |
| 6,091,417 | A | 7/2000 | Lefkowitz |
| 6,094,657 | A | 7/2000 | Hailpern et al. |
| 6,098,081 | A | 8/2000 | Heidorn et al. |
| 6,108,637 | A | 8/2000 | Blumenau |
| 6,108,783 | A | 8/2000 | Krawczyk et al. |
| 6,115,646 | A | 9/2000 | Fiszman et al. |
| 6,121,965 | A | 9/2000 | Kenney et al. |
| 6,122,647 | A | 9/2000 | Horowitz et al. |
| 6,144,969 | A | 11/2000 | Inokuchi et al. |
| 6,151,624 | A | 11/2000 | Teare et al. |
| 6,154,128 | A | 11/2000 | Wookey et al. |
| 6,163,772 | A | 12/2000 | Kramer et al. |
| 6,167,521 | A | 12/2000 | Smith et al. |
| 6,167,523 | A | 12/2000 | Strong |
| 6,182,094 | B1 | 1/2001 | Humpleman et al. |
| 6,182,095 | B1 | 1/2001 | Leymaster et al. |
| 6,188,401 | B1 | 2/2001 | Peyer |
| 6,191,797 | B1 | 2/2001 | Politis |
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,253,366 | B1 | 6/2001 | Mutschler, III |
| 6,253,374 | B1 | 6/2001 | Dresevic et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |
| 6,272,506 | B1 | 8/2001 | Bell |
| 6,275,227 | B1 | 8/2001 | DeStefano |
| 6,275,599 | B1 | 8/2001 | Adler et al. |
| 6,279,042 | B1 | 8/2001 | Ouchi |
| 6,281,896 | B1 | 8/2001 | Alimpich et al. |
| 6,282,711 | B1 | 8/2001 | Halpern et al. |
| 6,286,033 | B1 | 9/2001 | Kishinsky et al. |
| 6,292,897 | B1 | 9/2001 | Gennaro et al. |
| 6,297,819 | B1 | 10/2001 | Furst |
| 6,300,948 | B1 | 10/2001 | Geller et al. |
| 6,307,955 | B1 | 10/2001 | Zank et al. |
| 6,308,179 | B1 | 10/2001 | Petersen et al. |
| 6,308,273 | B1 | 10/2001 | Goertzel et al. |
| 6,311,271 | B1 | 10/2001 | Gennaro et al. |
| 6,314,415 | B1 | 11/2001 | Mukherjee |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,342,907 | B1 | 1/2002 | Petty et al. |
| 6,343,149 | B1 | 1/2002 | Motoiwa |
| 6,343,302 | B1 | 1/2002 | Graham |
| 6,345,256 | B1 | 2/2002 | Milsted et al. |
| 6,345,278 | B1 | 2/2002 | Hitchcock et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,351,574 | B1 | 2/2002 | Yair et al. |
| 6,353,851 | B1 * | 3/2002 | Anupam et al. ............ 709/204 |
| 6,353,926 | B1 | 3/2002 | Parthesarathy et al. |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,367,013 | B1 | 4/2002 | Bisbee et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschler, III |
| 6,389,434 | B1 | 5/2002 | Rivette et al. |
| 6,393,456 | B1 | 5/2002 | Ambler et al. |
| 6,396,488 | B1 | 5/2002 | Simmons et al. |
| 6,408,311 | B1 | 6/2002 | Baisley et al. |
| 6,414,700 | B1 | 7/2002 | Kurtenbach et al. |
| 6,421,070 | B1 | 7/2002 | Ramos et al. |
| 6,421,656 | B1 | 7/2002 | Cheng et al. |
| 6,425,125 | B1 | 7/2002 | Fries et al. |
| 6,429,885 | B1 | 8/2002 | Saib et al. |
| 6,434,563 | B1 | 8/2002 | Pasquali et al. |
| 6,434,564 | B2 | 8/2002 | Ebert |
| 6,442,563 | B1 | 8/2002 | Bacon et al. |
| 6,442,755 | B1 | 8/2002 | Lemmons et al. |
| 6,446,110 | B1 | 9/2002 | Lection et al. |
| 6,449,617 | B1 | 9/2002 | Quinn et al. |
| 6,457,009 | B1 | 9/2002 | Bollay |
| 6,460,058 | B2 | 10/2002 | Koppolu et al. |
| 6,463,419 | B1 | 10/2002 | Kluss |
| 6,470,349 | B1 | 10/2002 | Heninger et al. |
| 6,473,800 | B1 | 10/2002 | Jerger et al. |
| 6,476,828 | B1 | 11/2002 | Burkett et al. |
| 6,476,833 | B1 | 11/2002 | Moshfeghi |
| 6,477,544 | B1 | 11/2002 | Bolosky et al. |
| 6,480,860 | B1 | 11/2002 | Monday |
| 6,487,566 | B1 | 11/2002 | Sundaresan |
| 6,490,601 | B1 | 12/2002 | Markus et al. |
| 6,493,702 | B1 | 12/2002 | Adar et al. |
| 6,501,864 | B1 | 12/2002 | Eguchi et al. |
| 6,502,101 | B1 | 12/2002 | Verprauskus et al. |
| 6,502,103 | B1 | 12/2002 | Frey et al. |
| 6,505,230 | B1 | 1/2003 | Mohan et al. |
| 6,505,300 | B2 | 1/2003 | Chan et al. |
| 6,507,856 | B1 | 1/2003 | Chen et al. |
| 6,516,322 | B1 | 2/2003 | Meredith |
| 6,519,617 | B1 | 2/2003 | Wanderski et al. |
| RE38,070 | E | 4/2003 | Spies et al. |
| 6,546,546 | B1 | 4/2003 | Van Doorn |
| 6,549,221 | B1 | 4/2003 | Brown et al. |
| 6,549,878 | B1 | 4/2003 | Lowry et al. |
| 6,549,922 | B1 | 4/2003 | Srivastava et al. |
| 6,553,402 | B1 | 4/2003 | Makarios et al. |
| 6,560,620 | B1 | 5/2003 | Ching |
| 6,560,640 | B2 | 5/2003 | Smethers |
| 6,563,514 | B1 | 5/2003 | Samar |
| 6,571,253 | B1 | 5/2003 | Thompson et al. |
| 6,578,144 | B1 | 6/2003 | Gennaro et al. |
| 6,581,061 | B2 | 6/2003 | Graham |
| 6,584,469 | B1 | 6/2003 | Chiang et al. |
| 6,584,548 | B1 | 6/2003 | Bourne et al. |
| 6,585,778 | B1 | 7/2003 | Hind et al. |
| 6,589,290 | B1 | 7/2003 | Maxwell et al. |
| 6,594,686 | B1 | 7/2003 | Edwards et al. |
| 6,598,219 | B1 | 7/2003 | Lau |
| 6,603,489 | B1 | 8/2003 | Edlund et al. |
| 6,604,099 | B1 | 8/2003 | Chung et al. |
| 6,606,606 | B2 | 8/2003 | Starr |
| 6,609,200 | B2 | 8/2003 | Anderson et al. |
| 6,611,822 | B1 | 8/2003 | Beams et al. |
| 6,611,840 | B1 | 8/2003 | Baer et al. |
| 6,611,843 | B1 | 8/2003 | Jacobs |
| 6,613,098 | B1 | 9/2003 | Sorge et al. |
| 6,615,276 | B1 | 9/2003 | Mastrianni et al. |
| 6,629,109 | B1 | 9/2003 | Koshisaka |
| 6,631,357 | B1 | 10/2003 | Perkowski |
| 6,631,379 | B2 | 10/2003 | Cox |
| 6,631,497 | B1 | 10/2003 | Jamshidi et al. |
| 6,631,519 | B1 | 10/2003 | Nicholson et al. |
| 6,632,251 | B1 | 10/2003 | Rutten et al. |
| 6,635,089 | B1 | 10/2003 | Burkett et al. |

| | | | | | |
|---|---|---|---|---|---|
| 6,636,845 B2 | 10/2003 | Chau et al. | 7,032,170 B2 | 4/2006 | Poulose |
| 6,643,633 B2 | 11/2003 | Chau et al. | 7,036,072 B2 | 4/2006 | Sulistio et al. |
| 6,643,652 B2 | 11/2003 | Helgeson et al. | 7,039,875 B2 | 5/2006 | Khalfay et al. |
| 6,643,684 B1 | 11/2003 | Malkin et al. | 7,051,273 B1 | 5/2006 | Holt et al. |
| 6,651,217 B1 | 11/2003 | Kennedy et al. | 7,058,663 B2 | 6/2006 | Johnston et al. |
| 6,654,737 B1 | 11/2003 | Nunez | 7,062,764 B2 | 6/2006 | Cohen et al. |
| 6,654,932 B1 | 11/2003 | Bahrs et al. | 7,065,493 B1 | 6/2006 | Homsi |
| 6,658,417 B1 | 12/2003 | Stakutis et al. | 7,080,083 B2 | 7/2006 | Kim et al. |
| 6,658,622 B1 | 12/2003 | Aiken et al. | 7,080,325 B2 | 7/2006 | Treibach-Heck et al. |
| 6,661,920 B1 | 12/2003 | Skinner | 7,086,009 B2 | 8/2006 | Resnick et al. |
| 6,668,369 B1 | 12/2003 | Krebs et al. | 7,086,042 B2 | 8/2006 | Abe et al. |
| 6,671,805 B1 | 12/2003 | Brown et al. | 7,088,374 B2 | 8/2006 | David et al. |
| 6,675,202 B1 | 1/2004 | Perttunen | 7,100,147 B2 | 8/2006 | Miller et al. |
| 6,678,717 B1 | 1/2004 | Schneider | 7,103,611 B2 | 9/2006 | Murthy et al. |
| 6,681,370 B2 | 1/2004 | Gounares et al. | 7,106,888 B1 | 9/2006 | Silverbrook et al. |
| 6,691,230 B1 | 2/2004 | Bardon | 7,107,282 B1 | 9/2006 | Yalamanchi |
| 6,691,281 B1 | 2/2004 | Sorge et al. | 7,107,521 B2 | 9/2006 | Santos |
| 6,697,944 B1 | 2/2004 | Jones et al. | 7,146,564 B2 | 12/2006 | Kim et al. |
| 6,701,434 B1 | 3/2004 | Rohatgi | 7,152,205 B2 | 12/2006 | Day et al. |
| 6,701,486 B1 | 3/2004 | Weber et al. | 7,168,035 B1 | 1/2007 | Bell et al. |
| 6,704,906 B1 | 3/2004 | Yankovich et al. | 7,178,166 B1 | 2/2007 | Taylor et al. |
| 6,711,679 B1 | 3/2004 | Guski et al. | 7,190,376 B1 | 3/2007 | Tonisson |
| 6,720,985 B1 | 4/2004 | Silverbrook et al. | 7,191,394 B1 | 3/2007 | Ardeleanu et al. |
| 6,725,426 B1 | 4/2004 | Pavlov | 7,213,200 B2 | 5/2007 | Abe et al. |
| 6,728,755 B1 | 4/2004 | de Ment | 7,236,982 B2 | 6/2007 | Zlatanov et al. |
| 6,735,721 B1 | 5/2004 | Morrow et al. | 7,272,789 B2 | 9/2007 | O'Brien |
| 6,745,367 B1 | 6/2004 | Bates et al. | 7,281,018 B1 | 10/2007 | Begun et al. |
| 6,748,385 B1 | 6/2004 | Rodkin et al. | 7,313,758 B2 | 12/2007 | Kozlov |
| 6,751,777 B2 | 6/2004 | Bates | 7,316,003 B1 | 1/2008 | Dulepet et al. |
| 6,754,874 B1 | 6/2004 | Richman | 7,318,237 B2 | 1/2008 | Moriconi et al. |
| 6,757,826 B1 | 6/2004 | Paltenghe | 7,334,178 B1 | 2/2008 | Stanciu et al. |
| 6,757,868 B1 | 6/2004 | Glaser et al. | 7,346,610 B2 | 3/2008 | Ruthfield et al. |
| 6,760,723 B2 | 7/2004 | Oshinsky et al. | 7,350,141 B2 | 3/2008 | Kotler et al. |
| 6,763,343 B1 | 7/2004 | Brooke et al. | 2001/0007109 A1 | 7/2001 | Lange |
| 6,772,139 B1 | 8/2004 | Smith, III | 2001/0022592 A1 | 9/2001 | Alimpich et al. |
| 6,772,165 B2 | 8/2004 | O'Carroll | 2001/0024195 A1 | 9/2001 | Hayakawa |
| 6,774,926 B1 | 8/2004 | Ellis et al. | 2001/0037345 A1 | 11/2001 | Kiernan et al. |
| 6,779,154 B1 | 8/2004 | Nussbaum et al. | 2001/0054004 A1 | 12/2001 | Powers |
| 6,781,609 B1 | 8/2004 | Barker et al. | 2001/0056429 A1 | 12/2001 | Moore et al. |
| 6,782,144 B2 | 8/2004 | Bellavita et al. | 2001/0056460 A1 | 12/2001 | Sahota et al. |
| 6,799,299 B1 | 9/2004 | Li et al. | 2002/0010700 A1 | 1/2002 | Wotring |
| 6,801,929 B1 | 10/2004 | Donoho et al. | 2002/0010743 A1 | 1/2002 | Ryan et al. |
| 6,816,849 B1 | 11/2004 | Halt, Jr. | 2002/0010746 A1 | 1/2002 | Jilk, Jr. et al. |
| 6,845,380 B2 | 1/2005 | Su et al. | 2002/0013788 A1 | 1/2002 | Pennell et al. |
| 6,845,499 B2 | 1/2005 | Srivastava et al. | 2002/0019941 A1 | 2/2002 | Chan et al. |
| 6,847,387 B2 | 1/2005 | Roth | 2002/0023113 A1 | 2/2002 | Hsing et al. |
| 6,848,078 B1 | 1/2005 | Birsan et al. | 2002/0026441 A1 | 2/2002 | Kutay et al. |
| 6,871,220 B1 | 3/2005 | Rajan et al. | 2002/0026461 A1 | 2/2002 | Kutay et al. |
| 6,874,130 B1 | 3/2005 | Baweja et al. | 2002/0032590 A1 | 3/2002 | Anand et al. |
| 6,876,996 B2 | 4/2005 | Czajkowski et al. | 2002/0032692 A1 | 3/2002 | Suzuki et al. |
| 6,889,359 B1 | 5/2005 | Conner et al. | 2002/0032706 A1 | 3/2002 | Perla et al. |
| 6,901,403 B1 | 5/2005 | Bata et al. | 2002/0032768 A1 | 3/2002 | Voskuil |
| 6,915,454 B1 | 7/2005 | Moore et al. | 2002/0035579 A1 | 3/2002 | Wang et al. |
| 6,931,532 B1 | 8/2005 | Davis et al. | 2002/0035581 A1 | 3/2002 | Reynar et al. |
| 6,941,510 B1 | 9/2005 | Ozzie et al. | 2002/0040469 A1 | 4/2002 | Pramberger |
| 6,941,511 B1 | 9/2005 | Hind et al. | 2002/0054126 A1 | 5/2002 | Gamon |
| 6,941,521 B2 | 9/2005 | Lin et al. | 2002/0057297 A1 | 5/2002 | Grimes et al. |
| 6,948,129 B1 * | 9/2005 | Loghmani ................... 715/751 | 2002/0065798 A1 | 5/2002 | Bostleman et al. |
| 6,948,133 B2 | 9/2005 | Haley | 2002/0065847 A1 | 5/2002 | Furukawa et al. |
| 6,948,135 B1 | 9/2005 | Ruthfield et al. | 2002/0070973 A1 | 6/2002 | Croley |
| 6,950,980 B1 | 9/2005 | Malcolm | 2002/0078074 A1 | 6/2002 | Cho et al. |
| 6,961,897 B1 | 11/2005 | Peel, Jr. et al. | 2002/0078103 A1 | 6/2002 | Gorman et al. |
| 6,963,875 B2 | 11/2005 | Moore et al. | 2002/0083318 A1 | 6/2002 | Larose |
| 6,968,503 B1 | 11/2005 | Chang et al. | 2002/0099952 A1 | 7/2002 | Lambert et al. |
| 6,968,505 B2 | 11/2005 | Stoll et al. | 2002/0100027 A1 | 7/2002 | Binding et al. |
| 6,993,714 B2 | 1/2006 | Kaler et al. | 2002/0112224 A1 | 8/2002 | Cox |
| 6,996,776 B1 | 2/2006 | Makely et al. | 2002/0129056 A1 | 9/2002 | Conant |
| 6,996,781 B1 | 2/2006 | Myers et al. | 2002/0133484 A1 | 9/2002 | Chau et al. |
| 7,000,179 B2 | 2/2006 | Yankovich et al. | 2002/0152222 A1 | 10/2002 | Holbrook |
| 7,002,560 B2 | 2/2006 | Graham | 2002/0152244 A1 | 10/2002 | Dean et al. |
| 7,003,722 B2 | 2/2006 | Rothchiller et al. | 2002/0156772 A1 | 10/2002 | Chau et al. |
| 7,020,869 B2 | 3/2006 | Abriari et al. | 2002/0156846 A1 | 10/2002 | Rawat et al. |
| 7,024,417 B1 | 4/2006 | Russakovsky et al. | 2002/0156929 A1 | 10/2002 | Hekmatpour |

| | | | | | |
|---|---|---|---|---|---|
| 2002/0169752 A1 | 11/2002 | Kusama et al. | 2004/0003031 A1 | 1/2004 | Brown et al. |
| 2002/0169789 A1 | 11/2002 | Kutay et al. | 2004/0003353 A1 | 1/2004 | Rivera et al. |
| 2002/0174147 A1 | 11/2002 | Wang et al. | 2004/0003389 A1 | 1/2004 | Reynar et al. |
| 2002/0174417 A1 | 11/2002 | Sijacic et al. | 2004/0010752 A1 | 1/2004 | Chan et al. |
| 2002/0178380 A1 | 11/2002 | Wolf et al. | 2004/0024842 A1 | 2/2004 | Witt |
| 2002/0184219 A1 | 12/2002 | Preisig et al. | 2004/0030991 A1 | 2/2004 | Hepworth et al. |
| 2002/0188597 A1 | 12/2002 | Kern et al. | 2004/0039990 A1 | 2/2004 | Bakar et al. |
| 2002/0188613 A1 | 12/2002 | Chakraborty et al. | 2004/0039993 A1 | 2/2004 | Kougiouris et al. |
| 2002/0194219 A1 | 12/2002 | Bradley et al. | 2004/0044961 A1 | 3/2004 | Pesenson |
| 2002/0196281 A1 | 12/2002 | Audleman et al. | 2004/0044965 A1 | 3/2004 | Toyama et al. |
| 2002/0196288 A1 | 12/2002 | Emrani | 2004/0054966 A1 | 3/2004 | Busch et al. |
| 2002/0198891 A1 | 12/2002 | Li et al. | 2004/0059754 A1 | 3/2004 | Barghout et al. |
| 2002/0198935 A1 | 12/2002 | Crandal, Sr. et al. | 2004/0073565 A1 | 4/2004 | Kaufman et al. |
| 2003/0004951 A1 | 1/2003 | Chokshi | 2004/0073868 A1 | 4/2004 | Easter et al. |
| 2003/0007000 A1 | 1/2003 | Carlson et al. | 2004/0078756 A1 | 4/2004 | Napper et al. |
| 2003/0014397 A1 | 1/2003 | Chau et al. | 2004/0083426 A1 | 4/2004 | Sahu |
| 2003/0018668 A1 | 1/2003 | Britton et al. | 2004/0088647 A1 | 5/2004 | Miller et al. |
| 2003/0020746 A1 | 1/2003 | Chen et al. | 2004/0088652 A1 | 5/2004 | Abe et al. |
| 2003/0023641 A1 | 1/2003 | Gorman et al. | 2004/0093596 A1 | 5/2004 | Koyano |
| 2003/0025732 A1 | 2/2003 | Prichard | 2004/0107367 A1 | 6/2004 | Kisters |
| 2003/0026507 A1 | 2/2003 | Zlotnick | 2004/0117769 A1 | 6/2004 | Lauzon et al. |
| 2003/0028550 A1 | 2/2003 | Lee et al. | 2004/0123277 A1 | 6/2004 | Schrader et al. |
| 2003/0037303 A1 | 2/2003 | Bodlaender et al. | 2004/0146199 A1 | 7/2004 | Berkner et al. |
| 2003/0043986 A1 | 3/2003 | Creamer et al. | 2004/0163041 A1 | 8/2004 | Engel |
| 2003/0046665 A1 | 3/2003 | Ilin | 2004/0172442 A1 | 9/2004 | Ripley |
| 2003/0048301 A1 | 3/2003 | Menninger | 2004/0181711 A1 | 9/2004 | Johnson et al. |
| 2003/0051243 A1 | 3/2003 | Lemmons et al. | 2004/0186762 A1 | 9/2004 | Beaven et al. |
| 2003/0055811 A1 | 3/2003 | Stork et al. | 2004/0189716 A1 | 9/2004 | Paoli et al. |
| 2003/0055828 A1 | 3/2003 | Koch et al. | 2004/0194035 A1 | 9/2004 | Chakraborty |
| 2003/0056198 A1 | 3/2003 | Al-Azzawe et al. | 2004/0205473 A1 | 10/2004 | Fisher et al. |
| 2003/0061386 A1 | 3/2003 | Brown et al. | 2004/0205525 A1 | 10/2004 | Murren et al. |
| 2003/0061567 A1 | 3/2003 | Brown et al. | 2004/0205534 A1 | 10/2004 | Koelle |
| 2003/0084424 A1 | 5/2003 | Reddy et al. | 2004/0205571 A1 | 10/2004 | Adler et al. |
| 2003/0093755 A1 | 5/2003 | O'Carroll | 2004/0205592 A1 | 10/2004 | Huang |
| 2003/0110443 A1 | 6/2003 | Yankovich et al. | 2004/0205605 A1 | 10/2004 | Adler et al. |
| 2003/0120578 A1 | 6/2003 | Newman | 2004/0205653 A1 | 10/2004 | Hadfield et al. |
| 2003/0120651 A1 | 6/2003 | Bernstein et al. | 2004/0205671 A1 | 10/2004 | Sukehiro et al. |
| 2003/0120659 A1 | 6/2003 | Anandampilla | 2004/0210599 A1 | 10/2004 | Friedman et al. |
| 2003/0120671 A1 | 6/2003 | Kim et al. | 2004/0221238 A1 | 11/2004 | Cifra et al. |
| 2003/0120686 A1 | 6/2003 | Kim et al. | 2004/0221245 A1 | 11/2004 | Chickles et al. |
| 2003/0126555 A1 | 7/2003 | Aggarwal et al. | 2004/0237030 A1 | 11/2004 | Malkin |
| 2003/0128196 A1 | 7/2003 | Lapstun et al. | 2004/0261019 A1 | 12/2004 | Imamura et al. |
| 2003/0135825 A1 | 7/2003 | Gertner et al. | 2004/0268229 A1 | 12/2004 | Paoli et al. |
| 2003/0140132 A1 | 7/2003 | Champagne et al. | 2005/0004893 A1 | 1/2005 | Sangroniz |
| 2003/0158897 A1 | 8/2003 | Ben-Natan et al. | 2005/0005248 A1 | 1/2005 | Rockey et al. |
| 2003/0163285 A1 | 8/2003 | Nakamura et al. | 2005/0015279 A1 | 1/2005 | Rucker |
| 2003/0167277 A1 | 9/2003 | Hejlsberg et al. | 2005/0015732 A1 | 1/2005 | Vedula et al. |
| 2003/0182268 A1 | 9/2003 | Lal | 2005/0022115 A1 | 1/2005 | Baumgartner et al. |
| 2003/0182327 A1 | 9/2003 | Ramanujam et al. | 2005/0027757 A1 | 2/2005 | Kiessig et al. |
| 2003/0187756 A1 | 10/2003 | Klivington et al. | 2005/0033728 A1 | 2/2005 | James |
| 2003/0187930 A1 | 10/2003 | Ghaffar et al. | 2005/0038711 A1 | 2/2005 | Marlelo |
| 2003/0188260 A1 | 10/2003 | Jensen et al. | 2005/0055627 A1 | 3/2005 | Lloyd et al. |
| 2003/0189593 A1 | 10/2003 | Yarvin | 2005/0060324 A1 | 3/2005 | Johnson et al. |
| 2003/0192008 A1 | 10/2003 | Lee | 2005/0060721 A1 | 3/2005 | Choudhary et al. |
| 2003/0200506 A1 | 10/2003 | Abe et al. | 2005/0065933 A1 | 3/2005 | Goering |
| 2003/0204511 A1 | 10/2003 | Brundage et al. | 2005/0065936 A1 | 3/2005 | Goering |
| 2003/0204814 A1 | 10/2003 | Elo et al. | 2005/0066287 A1 | 3/2005 | Tattrie et al. |
| 2003/0205615 A1 | 11/2003 | Marappan | 2005/0071752 A1 | 3/2005 | Marlatt |
| 2003/0212664 A1 | 11/2003 | Breining et al. | 2005/0076049 A1 | 4/2005 | Qubti et al. |
| 2003/0212902 A1 | 11/2003 | van der Made | 2005/0091285 A1 | 4/2005 | Krishnan et al. |
| 2003/0217053 A1 | 11/2003 | Bachman et al. | 2005/0091305 A1 | 4/2005 | Lange et al. |
| 2003/0220930 A1 | 11/2003 | Milleker et al. | 2005/0102370 A1 | 5/2005 | Lin et al. |
| 2003/0225469 A1 | 12/2003 | DeRemer et al. | 2005/0102612 A1 | 5/2005 | Allan et al. |
| 2003/0225768 A1 | 12/2003 | Chaudhuri et al. | 2005/0108104 A1 | 5/2005 | Woo |
| 2003/0225829 A1 | 12/2003 | Pena et al. | 2005/0108624 A1 | 5/2005 | Carrier |
| 2003/0226132 A1 | 12/2003 | Tondreau et al. | 2005/0114757 A1 | 5/2005 | Sahota et al. |
| 2003/0233374 A1 | 12/2003 | Spinola et al. | 2005/0132196 A1 | 6/2005 | Dietl |
| 2003/0233644 A1 | 12/2003 | Cohen et al. | 2005/0138086 A1 | 6/2005 | Pecht-Seibert |
| 2003/0236859 A1 | 12/2003 | Vaschillo et al. | 2005/0138539 A1* | 6/2005 | Bravery et al. ............... 715/507 |
| 2003/0236903 A1 | 12/2003 | Piotrowski | 2005/0171746 A1 | 8/2005 | Thalhammer-Reyero |
| 2003/0237046 A1 | 12/2003 | Parker et al. | 2005/0198086 A1 | 9/2005 | Moore et al. |
| 2003/0237047 A1 | 12/2003 | Borson | 2005/0198125 A1 | 9/2005 | Beck et al. ................ 709/223 |
| 2004/0002939 A1 | 1/2004 | Arora et al. | 2005/0198247 A1* | 9/2005 | Perry et al. ................ 709/223 |

| | | | |
|---|---|---|---|
| 2005/0223063 A1 | 10/2005 | Chang et al. | |
| 2005/0223320 A1 | 10/2005 | Brintzenhofe et al. | |
| 2005/0246304 A1 | 11/2005 | Knight et al. | |
| 2005/0268222 A1 | 12/2005 | Cheng | |
| 2006/0020586 A1 | 1/2006 | Prompt et al. | |
| 2006/0026534 A1 | 2/2006 | Ruthfield et al. | |
| 2006/0031757 A9 | 2/2006 | Vincent | |
| 2006/0036995 A1 | 2/2006 | Chickles et al. | |
| 2006/0041838 A1 | 2/2006 | Khan | |
| 2006/0059434 A1 | 3/2006 | Boss et al. | |
| 2006/0069605 A1 | 3/2006 | Hatoun | |
| 2006/0069985 A1 | 3/2006 | Friedman et al. | |
| 2006/0080657 A1 | 4/2006 | Goodman | |
| 2006/0085409 A1 | 4/2006 | Rye et al. | |
| 2006/0101037 A1 | 5/2006 | Brill et al. | |
| 2006/0101051 A1 | 5/2006 | Carr et al. | |
| 2006/0129978 A1 | 6/2006 | Abriani et al. | |
| 2006/0143220 A1 | 6/2006 | Spencer, Jr. | |
| 2006/0161559 A1 | 7/2006 | Bordawekar et al. | |
| 2006/0200754 A1* | 9/2006 | Kablesh et al. | 715/505 |
| 2007/0036433 A1 | 2/2007 | Teutsch | |
| 2007/0050719 A1 | 3/2007 | Lui et al. | |
| 2007/0061467 A1 | 3/2007 | Essey | |
| 2007/0061706 A1 | 3/2007 | Cupala | |
| 2007/0074106 A1 | 3/2007 | Ardeleanu | |
| 2007/0094589 A1 | 4/2007 | Paoli | |
| 2007/0100877 A1 | 5/2007 | Paoli | |
| 2007/0101280 A1 | 5/2007 | Paoli | |
| 2007/0130504 A1 | 6/2007 | Betancourt et al. | |
| 2007/0186157 A1* | 8/2007 | Walker et al. | 715/530 |
| 2007/0208606 A1 | 9/2007 | MacKay et al. | |
| 2007/0208769 A1 | 9/2007 | Boehm et al. | |
| 2008/0028340 A1 | 1/2008 | Davis | |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 01/44934 | 6/2001 |
| WO | WO0157720 | 8/2001 |

OTHER PUBLICATIONS

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE. html>>, Jupitermedia Corporation, 2006, pp. 07.

Atova, "User Reference manual Version 4.4, XML Spy suite 4.4," Atova Ges.m.b.H and Altova, Inc., May 24, 2002, pages cover, copyright page, 1-565.

Altova, et al., "XML Spy, XML integrated Development Environments," Altova Inc., 2002, pp. 1-18.

Ben-Natan, U.S. Appl. No. 60/203,081, filed May 9, 2000, entitled "Internet platform for creating and supporting communities".

Cybook, Inc., "Copying the Search Form to Services-based Web Sites," Internet Article, (online) Jul. 26, 2004.*the whole document*.

Excel Developer Tip (hereinafter "Excel"), "Determining the Data Type of a Cell", available at <<http://jwalk.com/ss//excel/tips/tip62.htm>>, May 13, 1998, p. 1.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, download pp. 1-16.

Kutay, U.S. Appl. No. 60/209,713, filed Jun. 5, 2000, entitled, "Methods and systems for accessing, organizing presenting and viewing data".

Macromedia, Inc., "Dreamweaver Technote, Changes in copying and pasting in Dreamweaver 4," Internet Article (online). *the whole document*.

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Rado, "How to create a template that makes it easy for users to 'fill in the blanks', without doing any programming," Microsoft Word MVP FAQ Site, (online) Apr. 30, 2004, the whole document.

Halberg, et al., "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Acklen, et al., "Using corel Wordperfect 9", 251-284, 424-434, 583-586 (1998).

LeBlond, et al., "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Mansfield, "Excel 97 for Busy People", Published by Osborne/Mcgraw-Hill 1997 pp. 48-50.

Alschuler, "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.

"Architecture for a Dynamic Information Area Control" IBM Technical Disclosure Bulletin IBM Corp. New York US vol. 37 No. 10 Jan. 10, 1994. pp. 245-246.

Irene, et al., "Netscape Communicator's Collapsible Toolbars" CHI'98 Human Factors in Computing Systems Conference Proceedings Los Angeles CA Apr. 18-23, 1998 pp. 81-86.

Barker, et al., "Creating In-Line Objects Within An Integrated Editing Environment," IBM Technical Disclosure Bulletin, vol. 27, No. 5, Oct. 1984, p. 2962.

Battle, et al., "Flexible Information Presentation with XML" 1998 The Institution of Electrical Engineers 6 pages.

Berg, "Naming and Binding: Monikers" Inside OLE, 1995, Chapter 9, pp. 431-490.

Brogden, "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

Chen Yi, et al., "XKvalidator: A Constraint Validator for XML" CIKM '-2 Nov. 4-9, 2002 Copyright 2002 ACM 1-58113-492-4/02/0011 pp. 446-452.

Bing, et al., "Designing Valid XML Views" ER 2002 LNCS 2503 2002 Springer-Verlag Berlin Heidelberg 2002 pp. 463-477.

Chien, et al., "Efficient Management of Multiversion Documents by Object Referencing" Proceedings of the 27th VLDB Conference 2001 pp. 291-300.

Chien, "Efficient schemes for managing multiversion XML documents" VLDB Journal (2002) pp. 332-352.

Chien, et al., "Storing and Querying Multiversion XML Documents using Durable Node Numbers" IEEE 2002 pp. 232-241.

Chien, et al., "XML Document Versioning" SIGMOD Record vol. 30 No. 3 Sep. 2001 pp. 46-53.

Chuang, "Generic Validation of Structural Content with Parametric Modules" ICFP '01 Sep. 3-5, 2001 Copyright 2001 ACM 1-58113-415-0/01/0009 pp. 98-109.

Ciancarini, et al.,"Managing Complex Documents Over the WWW: A Case Study for XML" IEEE Transactions on Knowledge and Data Engineering Vo.l. 11 No. 4 Jul./Aug. 1999. pp. 629-938.

Clapp, The NeXT Application Kit Part 1: Non-Responsives Classes, The NeXT Bible 1990, Chapter 16, pp. 275-293.

Clark, (W3C Editor); "XSL Transformation (XSLT) Verison 1.0" Nov. 16, 1999 W3C (MIT INRIA Kejo) pp. 1-156.

Clark (W3C Editor James Clark and Ste), "XML Path Language (XPath) Version 1.0" Nov. 16, 1999 W3C (MIT Inria Kejo) pp. 1-49.

Clarke, "From small beginnings" Knowledge Management Nov. 2001 pp. 28-30.

Davidow, "XML Editors: Allegations of Functionality in search of reality" Internet 'Online! 1999 XP002230082 retrieved from the Internet <URL:http://www.ivritype.com/xml/>.

Dayton, et al., "Photo Shop 5/5.5 WOW! Book" 2000 Peachpit Press pp. 8-17.

Description of Whitehill Composer software product producted by Whitehill Technologies Inc. available at <http://www.xml.com/pub/p/221> accessed on Apr. 8, 2004, two pages.

DiLascia, et al., "Sweeper" Microsoft Interactive Developer, vol. 1, No. 1, 1996, 27 pages.

Dyck, "XML Spy Tops as XML Editor" http://www.eweek.com/article2/0395972404100.asp Nov. 25, 2002 4 pages.

Hall, "Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

Hardy, et al., "Mapping and Displaying Structural Transformations between XML and PDF" DocEng '02 Nov. 8-9, 2002 Copyright 2002 ACM 1-58113-597-7/02/0011 pp. 95-102.

Haukeland, "Tsbiff—tildeslash biff—version 1.2.1" Internet Document [Online] Jun. 1999 URL: http://web.archive.org/web/19990912001527/http://www.tildeslash.com/tsbiff/.

Herzner, et al., "CDAM—Compound Document Access and Management. An Object-Oriented Approach" Multimedia Systems Interaction and Applications, 1992, Chapter 3, pp. 17-36.

Hwang, et al., "Micro-Firewalls for Dynamic Network Security with Distributed Intrusion Detection"; IEEE International Symposium on Network Computing and Applications; 2001; pp. 68-79.

Kaiya, et al., "Specifying Runtime Environments and Functionalities of Downloadable Components Under the Sandbox Mode"; International Symposium on Principles of Software Evolution; 2000; pp. 138-142.

Hirotaka, et al., "An Efficiently Updatable Index Scheme for Structured Documents" 1998 IEEE pp. 991-996.

Sang-Kyun, et al., "Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Kobayashi, et al., "An Update on BTRON-specification OS Development" IEEE 1991, pp. 132-140.

Komatsu, et al., "A Proposal on Digital Watermark in Document Image Communication and Its Application to Realizing a Signature" Electronics and Communications in Japan Part 1: Communications vol. 73 No. 5, May 1990, pp. 22-33.

McCright, "New Tool Kit to Link Groove with Microsoft Sharepoint" eWeek Enterprise News & Reviews Ziff Davis Media Inc. Jul. 29, 2002.

Musgrave, "Networking technology—impact and opportunities" Survey and Statistical Computing 1996. Proceedings of the Second ASC International Conference. Sep. 1996. pp. 369-378. London UK.

Nelson, "Validation with MSXML and XML Schema" Windows Developer Magazine Jan. 2002 pp. 35-38.

"SmartUpdate Developer's Guide"; Netscape Communication Corp., Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

Noore, "A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

Pacheco, et al., "Delphi 5 Developer's Guide" Sams Publishing 1999 Chapter 31 Section: Data Streaming 6 pages.

Peterson, "Unix Variants," Unix Review, vol. 10, No. 4, Apr. 1992, pp. 29-31.

Pike, et al., "Plan 9 from Bell Labs" UKUUG, Summer 1990, 10 pages.

Pike, et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html, (Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 By Example", Retrieved from the Internet at http://www.perfectxml.com/InfoPath.asp on Jan. 21, 2007,(Apr. 20, 2003).

Raman, T. V., et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hereterogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,25 pages.

"Microsoft Word 2000", Screenshots,(1999),1-5.

"Microsoft Word 2000 Screenshots", (2000),11-17.

Pacheco, Xavier et al., "Delphi 5 Developer's Guide", Sams Publishing. Chapter 31, Section: Data Streaming,(1999),4.

Bradley, Neil "The XML Companion, Third Edition", *Published by Addison Wesley Professional*, http://proquest.safaribooksonline.com0201770598, http,(Dec. 12, 2001),1-18.

Klarlund, Nils "DSD: A Schema Language for XML", *ACM, FSMP Portland Oregon*, (2000),101-111.

Watt, Andrew "MIcrosoft Office Infopath 2003 Kick Start", (*Published by Sams*) Print ISBN-10:0-672-32623-X, (Mar. 24, 2004),1-57.

Grosso, et al., "XML Fragment Interchange", W3C,(Feb. 2001),1-28.

Altova, et al., "User and Reference Manual Version 4.4", www.xmlspy.com, (May 24, 2007),1-565.

"XForm 1.0", W3C,(Jul. 16, 2001).

Xmlspy, "XmlSpy 2004 Enterprise Edition Manual", Altova,(May 17, 2004),1-25, 220-225.

Stylusstudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Hu, et al., "A Programmable Editor for Developing Structured Documents based on Bidirectional Transformations", ACM,(Aug. 2004),178-179.

* cited by examiner

SCALABLE OBJECT MODEL

TECHNICAL FIELD

This invention relates to object model systems and methods.

BACKGROUND

Conventional Web-based form-rendering systems, such as a server device that renders an HTML form for requesting client devices, generate a logical representation of a form as a collection of objects each time that the form is requested. A form can expose an object model that allows a form designer to write code that processes events generated while a user edits the form via a user interface displayed at a client device. Additional objects may also be generated for each form request from multiple client devices. For example, some objects are specific to each editing session which is the time duration from when a user at a client device begins to fill-out a form until the form is closed.

A server system, which may include any number of form servers, may process hundreds of concurrent requests for a particular form. Server system resources incur undue overhead when having to recreate the objects every time that a client device submits a form request. Additional overhead is required to maintain all of the private objects for the duration of each session.

Systems that implement an architecture where objects are created and destroyed for every request are inefficient, and overly-tax server resources, such as processors and memory. In addition, these types of architectures do not scale in a desirable manner and may require complex synchronization.

SUMMARY

Scalable object model is described herein.

In an implementation of scalable object model, one or more objects corresponding to a form are instantiated in response to a request for the form from a first client device, and an events manager is instantiated through which the one or more objects register to process data manipulation events associated with the form. Data specific to the first client device is processed with the one or more objects that correspond to the form via a first processor thread. An additional request from a second client device is received and additional data specific to the second client device is processed with the one or more objects that correspond to the form via a second processor thread. The one or more objects are shared by the first client device and the second client device to process the data manipulation events associated with the form.

BRIEF DESCRIPTION OF THE DRAWINGS

The same numbers are used throughout the drawings to reference like features and components.

DETAILED DESCRIPTION

Scalable object model provides for single-instancing of internal runtime objects such that a single instance of a logical object (or an objects collection) can be utilized across multiple sessions and for multiple requests. When a form is first requested, the objects collection is created, or instantiated, along with an events manager through which the objects register to process events associated with the form, such as when a user edits the form displayed at a client device. The events manager binds the event handlers that are used by the objects to process a request and to respond to user actions. Multiple requests for the form are processed with the single instance of the objects collection and the object code is shared among all of the active sessions.

In addition, the multiple requests are each processed with the objects collection via a different processor thread. Data specific to a particular request is maintained within a thread local storage corresponding to a particular processor thread. The thread local storage associated with a particular request is used for the duration of the processing of a particular request. Thread-based storage that is specific to a particular request abstracts the data that is specific to the requesting device, and to the particular request, from the logical objects such that the single instance of the objects can process multiple requests that each have different associated data.

In addition to the thread local storage associated with a particular request, a persisted data store maintains data corresponding to a form editing session when the request is not being processed by a processor thread. Although a processor thread is utilized by only one request at time, the same processor thread can sequentially process requests from several different users in different sessions, and the persisted data store maintains the data for continued form editing. The persistent data store is transparent to the object model and is implemented such that the data corresponding to a form editing session is moved from the persisted data store to the thread local storage when a processor thread is assigned to a particular user request.

While aspects of the described systems and methods for scalable object model can be implemented in any number of different computing systems, environments, and/or configurations, embodiments of scalable object model are described in the context of the following exemplary system architectures.

Figure 1:
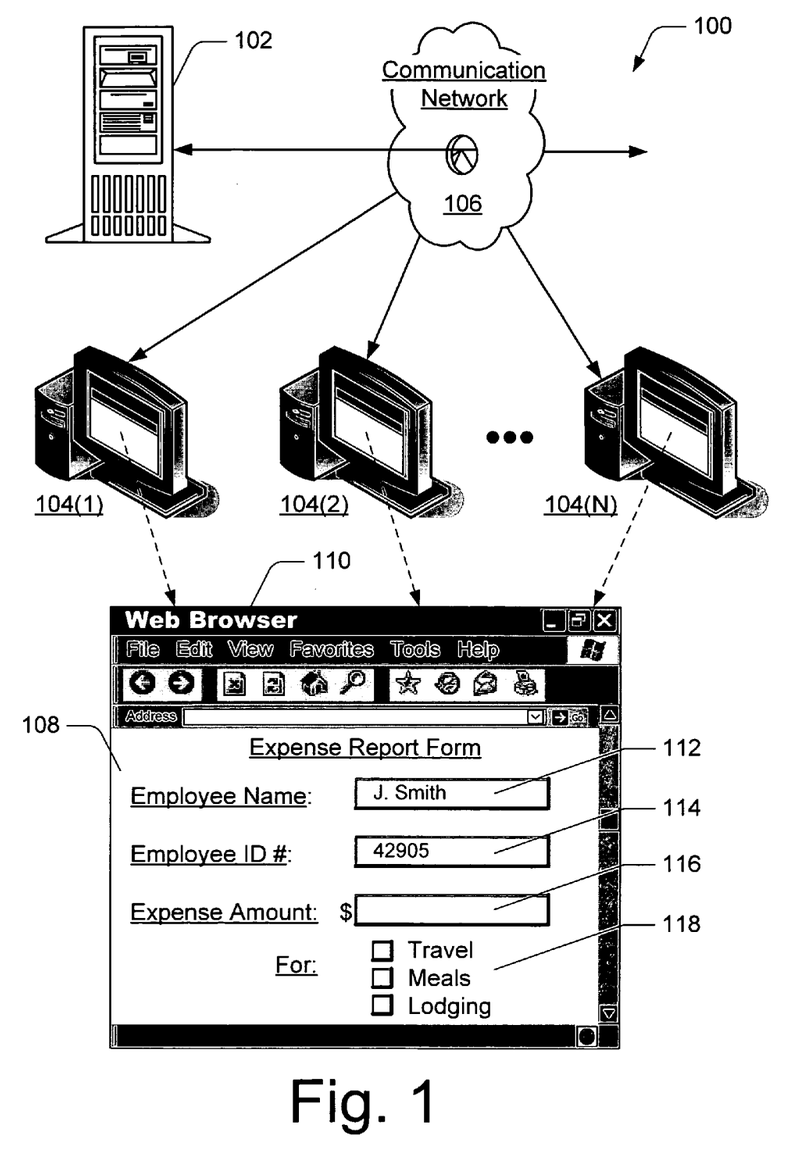
FIG. 1 illustrates an exemplary client-server system in which embodiments of scalable object model can be implemented.

FIG. 1 illustrates an exemplary client-server system 100 in which an embodiment of scalable object model can be implemented. The client-server system 100 includes a server device 102 and any number of client devices 104(1-N) configured for communication with server device 102 via a communication network 106, such as an intranet or the Internet. A client and/or server device may be implemented as any form of computing or electronic device with any number and combination of differing components as described below with reference to the exemplary computing environment 500 shown in FIG. 5.

In an implementation of the exemplary client-server system 100, server device 102 is a form server that accepts HTTP requests for a form or document from client devices 104(1-N). The form server 102 communicates the requested data to one or more of the requesting client devices 104(1-N) which can each render a form 108 for display as an HTML page through a user agent, such as Web browser 110. In the context of a user agent that comprises a Web browser, the user agent enables a user to access the Internet and to interact with form server 102 to receive and edit form 108 which is provided by form server 102.

In this example, form 108 is a user-interactive Expense Report Form that a user might access at a web site or company site, for example, to enter expenses for a business trip. The form 108 includes various fields that can be filled-in with employee specific information via interaction with data input devices at a client device 104. Form 108 includes information fields such as an employee name field 112, an employee identifier number field 114, an expense amount field 116, and several selectable fields 118 that identify the type of expense entered into the expense amount field 116. A user can interact with form 108 to fill in the information fields 112-118 and/or one or more of the information fields may already be populated for the user with a data entry when the form is rendered. The form server 102, for example, can maintain data for a particular user when the form was last utilized by the user and populate the information fields for which the server has maintained the data.

When a user interacts with a particular form via a client device 104, a user agent executing on the client device (e.g., Web browser application 110) can keep track of the changes made to the form, as well as the order of the changes or events that are generated by the user's interaction with the form. The user agent can then periodically communicate those changes, in the order that the changes occurred, to the appropriate form server 102 for processing.

In one embodiment, the user agent can make the changes directly on the form 108 that the user interacts with. For example, if a user manipulates the structure of the form at a client device 104 by adding a new expense line-item to the report, the user agent may implement the structural change and then communicate those changes to the form server 102 for processing. Scalable object model is applicable for any user actions, such as to submit data or changes, query for new data, and/or for any actions that do not modify the form, yet are processed as requests at the server device 102.

When the form server 102 receives the changes or events generated by user interaction with the form 108, the form server 102 can then process the changes and return appropriate data to the client device 104 for rendering. More specifically, when the form server 102 receives the data that describes the user changes and the order in which the changes were made to a form, the form server 102 can process the data to generate processed data that can be sent to the client device and rendered as an updated form on the client device 104.

Figure 2:
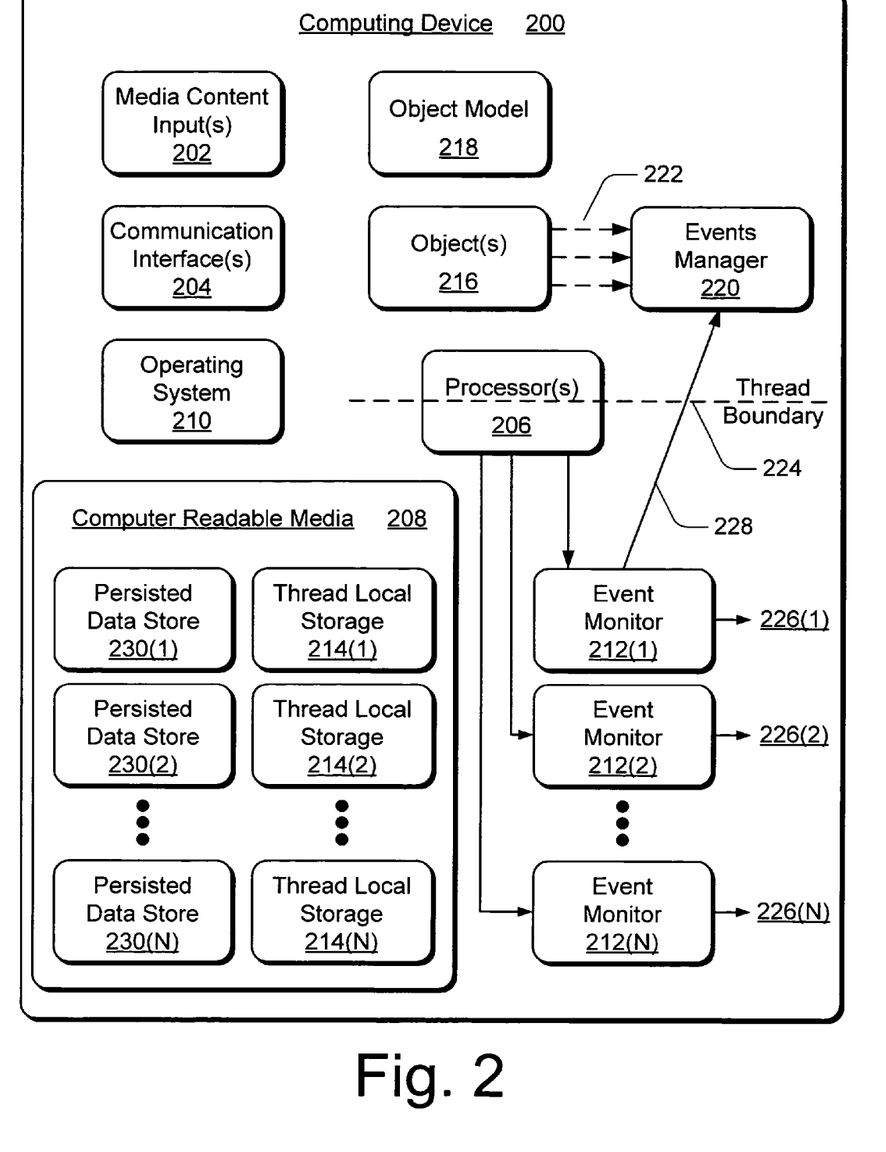
FIG. 2 illustrates various components of an exemplary computing device in which embodiments of scalable object model can be implemented.

FIG. 2 illustrates various components of an exemplary computing device 200 in which embodiments of scalable object model can be implemented. For example, form server 102 can be implemented as computing device 200 in the exemplary client-server system 100 described with reference to FIG. 1. Computing device 200 can also be implemented as any form of computing or electronic device with any number and combination of differing components as described below with reference to the exemplary computing environment 500 shown in FIG. 5.

The computing device 200 includes one or more media content inputs 202 which may include Internet Protocol (IP) inputs over which streams of media content are received via an IP-based network. Computing device 200 further includes communication interface(s) 204 which can be implemented as any one or more of a serial and/or parallel interface, a wireless interface, any type of network interface, and as any other type of communication interface. A wireless interface enables computing device 200 to receive control input commands and other information from an input device, and a network interface provides a connection between computing device 200 and a communication network (e.g., network 106 shown in FIG. 1) by which other electronic and computing devices can communicate data with computing device 200.

Computing device 200 also includes one or more processors 206 (e.g., any of microprocessors, controllers, and the like) which process various computer executable instructions to control the operation of computing device 200, to communicate with other electronic and computing devices, and to implement embodiments of scalable object model. Computing device 200 can be implemented with computer readable media 208, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 208 provides data storage mechanisms to store various information and/or data such as software applications and any other types of information and data related to operational aspects of computing device 200. For example, an operating system 210 and/or other application programs can be maintained as software applications with the computer readable media 208 and executed on processor(s) 206 to implement embodiments of scalable object model.

In an embodiment of scalable object model, computing device 200 receives a request for a form or document from a user agent of a client device, such as an HTTP request for an HTML form from a client device 104 that implements Web browser 110 (FIG. 1). An event monitor 212(1) and a thread local storage 214(1) can be generated that each correspond to the requesting client device 104. Data that is specific to a particular client device 104(1-N) is maintained by a respective thread local storage 214(1-N) for the duration that a request from the particular client device 104 is being processed by the one or more processors 206.

When a first request for a form or document is received at computing device 200, one or more object(s) 216 (also referred to as an objects collection for more than one object) are instantiated, and correspond to the requested form or document. The object(s) 216 (hereinafter, "objects") can process requests for data manipulation corresponding to user-selectable actions and user inputs to an interactive form displayed through Web browser 110 at a client device 104. The one or more objects 216 are instantiated in response to a request for a form (e.g., expense report form 108) that is displayed for viewing at a client device 104.

The objects 216 include the object model 218 which the computing device 200 (e.g., form server 102) exposes to the object code of objects 216 to process data and information associated with the form, such as a change to a field value, a call to a form function, and the like. Additionally, an events manager 220 is instantiated as an object when the first request for the form or document is received, and the objects 216 register to process data manipulation events 222 with the events manager 220.

The one or more objects 216 and the events manager 220 are shared across all processing sessions. The event registrations 222 between the objects 216 and the events manager 220 are established when the objects 216 and the events manager 220 are initialized. Any updates to the shared stated of the objects 216 and the events manager 220 need only occur at the time of initialization, and thus only incur synchronization overhead for the first received form request. Thereafter, subsequent form requests for data manipulation by the objects 216 do not implement a write-lock which, in an embodiment of scalable object model, decreases runtime complexity and improves scalability.

The one or more objects 216 and the events manager 220 are instantiated when a session is established, such as in computing device 200 when implemented as a form server (e.g., as form server 102 (FIG. 1)). A single instance of each of the one or more objects 216 and the events manager 220 are maintained for an active user session. Instead of creating the objects 216 for each form request, just one instance of the objects 216 is created such that the objects 216 and the events manager 220 are shared to process multiple requests from one or more client devices.

For each request for a form or a document received from client devices 104(1-N), a respective and corresponding event monitor 212(1-N) and thread local storage 214(1-N) is generated. As shown in FIG. 2, an event monitor 212 and a thread local storage 214 specific to a particular client request is instantiated on one side of a processor thread boundary 224, while the objects 216 and the events manager 220 are instantiated only once on another side of the processor thread boundary 224.

The objects 216 and the events manager 220 are described, merely for purposes of this discussion, as being instantiated "above" the thread boundary 224, while the components specific to each form request are instantiated "below" the thread boundary 224. In practice, the terms "above" and "below" are merely descriptive and may simply be implementation specific. Each client request that is received at computing device 200 from client devices 104(1-N) is processed with objects 216 via a separate, respective processor thread 226(1-N) to process data that is specific to the requesting client device 104(1-N).

Each of the event monitors 212(1-N) register 228 with the events manager 220 (only one event monitor 212(1) is shown to register with events manager 220 in FIG. 2). An event monitor 212 monitors for a change in event data and notifies the events manager 220 of a data manipulation event corresponding to the data that is specific to a request from a respective client device 104. The events manager 220 communicates, or notifies, the objects 216 of the data manipulation event via one or more of the event registrations 222. As illustrated in FIG. 2, each new form request received by computing device 200 results in only one new registration 228 (e.g., from the corresponding event monitor 212 to the events manager 220), rather than having to duplicate the multiple event registrations 222. Accordingly, the multiple event monitors 212(1-N) are synchronized such that each can communicate with the objects 216 via the events manager 220 without conflict.

Thread-based storage with thread local storage, such as a thread local storage 214 that is specific to a particular client device 104, is an abstraction that shields the objects 216 from the complexity of implementing only a single instance of the objects 216 and the events manager 220. Thread local storage abstracts the data that is specific to a particular client device from the object code itself. When a form request is received, the logic of the object code can request or lookup the data in the related thread local storage 214 that corresponds to the current thread 226 being processed through objects 216. The objects 216 can then process the data that is specific to a request in the current stack of execution without mixing up the several different contexts (e.g., processor threads 226(1-N)) that may be utilizing the same objects 216 at approximately the same time.

In addition to the thread local storage 214(1-N) that are each associated with a particular request from a client device, a persisted data store 230(1-N) maintains data corresponding to a form editing session when the request is not being processed by a respective processor thread 226(1-N). Although a processor thread 226 is utilized by only one request at time, the same processor thread 226 can sequentially process requests from several different users in different sessions, and the corresponding persisted data store 230 maintains the data for continued form editing. A persisted data store 230 is transparent to the object model 218 (and to the objects collection 216) and is implemented such that the data corresponding to a form editing session is moved from a persisted data store 230(1) to the respective thread local storage 214(1) when a processor thread 226(1) is assigned to a particular user request.

Methods for scalable object model, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
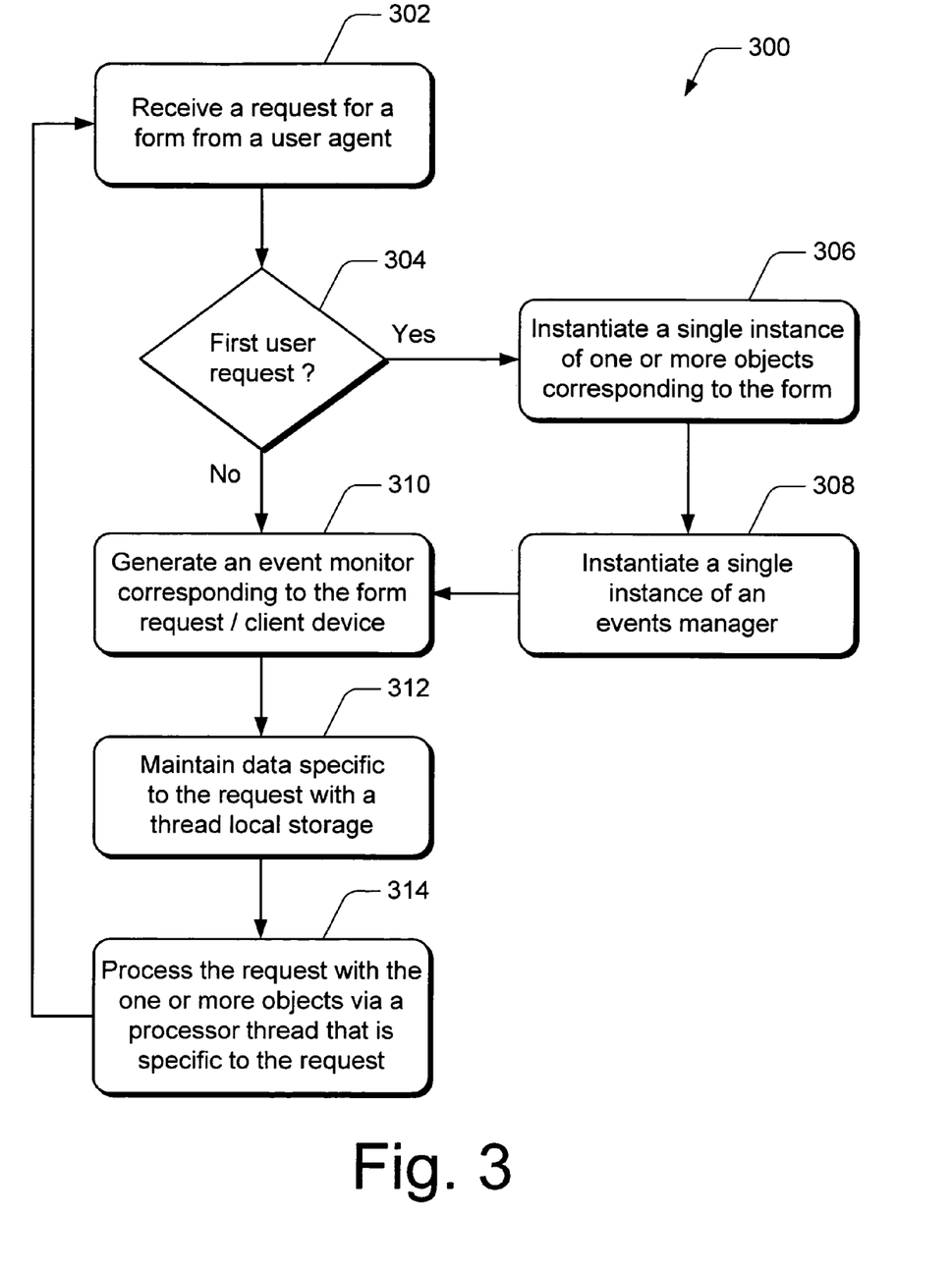
FIG. 3 is a flow diagram that illustrates an exemplary method for scalable object model.

FIG. 3 illustrates an exemplary method 300 for scalable object model and is described with reference to an exemplary computing device, such as shown in FIG. 2. The order in which the method is described is not intended to be construed as a limitation, and any number of the described method blocks can be combined in any order to implement the method. Furthermore, the method can be implemented in any suitable hardware, software, firmware, or combination thereof.

At block 302, a request for a form is received from a user agent. For example, form server 102 (FIG. 1) receives an HTTP request for an HTML form 108 from a Web browser 110 of a client device 104(1). The request may be a user-selectable request to invoke a form for display at the beginning of an editing session initiated at the client device 104(1). At block 304, a determination is made as to whether the request is a first request from a first user agent (e.g., a Web browser implemented at a client device).

If the request is determined to be a first request (i.e., "yes" from block 304), then one or more objects are instantiated that correspond to the form in response to the request at block 302. For example, when form server 102 (e.g., implemented as computing device 200) receives a first client request for a form 108, a single instance of the one or more objects 216 (FIG. 2) are instantiated. The objects 216 (e.g., objects collection) are the logic code associated with the HTML form 108 displayed for viewing at the client device 104(1). Additionally, at block 308, an events manager is also instantiated. For example, a single instance of events manager 220 is instantiated through which the objects 216 register to process data manipulation events 222. The objects 216 and the events manager 220 are instantiated such that the objects 216 and the events manager 220 can process multiple requests from one or more client devices 104(1-N) for the duration of the multiple user sessions.

If the request is not determined to be a first request (i.e., "no" from block 304), or continuing from block 308, an event monitor corresponding to the form request and the requesting client device is generated at block 310. For example, an event monitor 212(1) and a thread local storage 214(1) that are specific to the client device 104(1) and the form request are generated. At block 312, the data that is specific to the client device is maintained with a thread local storage. For example, the thread local storage 214(1) maintains data (e.g., in computer readable media 208) that is specific to client device 104(1). The data can include persisted data plus new data or just new data that is submitted, processed, generated, or the like from an interactive form displayed through a Web browser at a client device. The persisted data can be obtained from a persisted data store 230(1) that corresponds to client device 104(1) and the form request.

At block 314, the form request is processed with the one or more objects via a processor thread that is specific to the request. For example, a client request for form 108 is processed with objects 216 via a processor thread 226(1). Data that is specific to the requesting client device 104(1) is processed with the objects 216 that correspond to the form.

The method 300 continues at block 302 to receive an additional request for the form from another user agent. For example, form server 102 receives an additional HTTP request for the HTML form 108 from Web browser 110 of client device 104(2). The method continues at block 310 and an additional event monitor is generated that corresponds to the second client device 104(2). At block 312, the additional data that is specific to the second client device 104(2) is maintained with a second thread local storage 214(2). At block 314, the additional form request is processed with the one or more objects via a second processor thread that is specific to the second client device 104(2).

Figure 4:
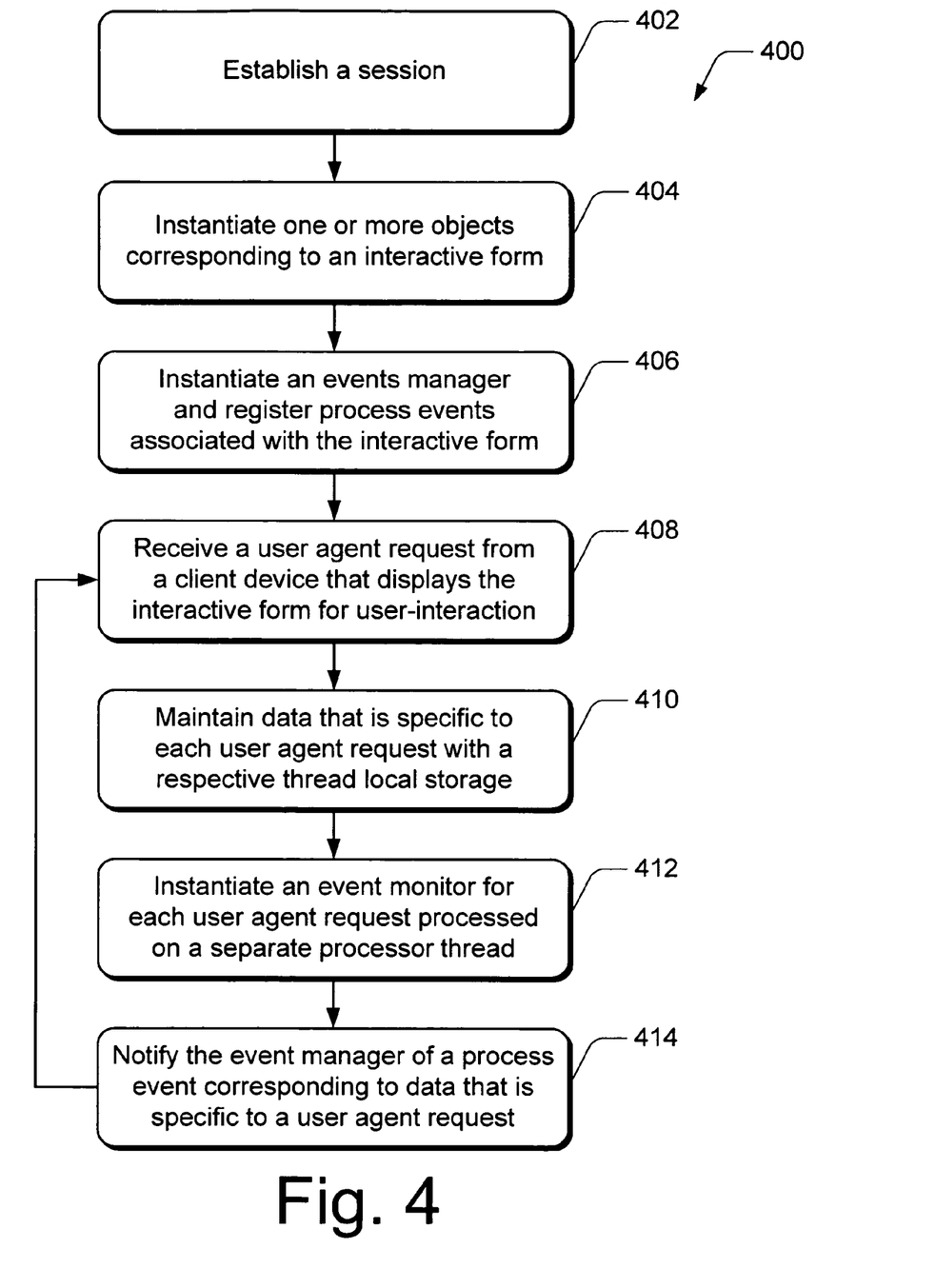
FIG. 4 is a flow diagram that illustrates an exemplary method for scalable object model.

FIG. 4 illustrates an exemplary method 400 for scalable object model and is described with reference to an exemplary computing device, such as shown in FIG. 2. The order in which the method is described is not intended to be construed as a limitation, and any number of the described method blocks can be combined in any order to implement the method. Furthermore, the method can be implemented in any suitable hardware, software, firmware, or combination thereof.

At block 402, a session is established, and at block 404, one or more objects corresponding to an interactive form are instantiated. For example, a single instance of the one or more objects 216 (FIG. 2) are instantiated and correspond to the HTML form 108 (FIG. 1) displayed for viewing at the client device 104(1) through Web browser 110. The objects 216 are instantiated above a thread boundary 224 of a processor 206 and processes multiple user agent requests which are each processed on a separate processor thread 226(1-N).

At block 406, an events manager is instantiated and process events associated with the interactive form are registered with the events manager. For example, a single instance of events manager 220 is instantiated and registers process events 222 of the one or more objects 216. The one or more objects 216 and the events manager 220 are instantiated when a session is established. The single instance of each of the one or more objects 216 and the events manager 220 are maintained for a duration during which the objects 216 and the events manager 220 process multiple requests from one or more client devices 104(1-N).

At block 408, a user agent request is received from a client device that displays the interactive form for user-interaction. For example, form server 102 receives an HTTP request for interactive form 108 from a Web browser 110 of a client device 104(1). The request may be a user-initiated request to manipulate data 112-118 associated with the interactive form 108 displayed at the client device 104(1).

At block 410, data that is specific to each user agent request is maintained with a respective thread local storage corresponding to each user agent request that is processed on a separate processor thread. For example, thread local storage 214(1) maintains data (e.g., in computer readable media 208) that is specific to client device 104(1), thread local storage 214(2) maintains data that is specific to client device 104(2), and so on. The data specific to any one client device can include persisted data plus new data or just new data that is submitted, processed, generated, or the like from an interactive form displayed through a Web browser at a client device.

At block 412, an event monitor is instantiated for each user agent request processed on a separate processor thread. For example, event monitor 212(1) is instantiated specific to client device 104(1), event monitor 212(2) is instantiated specific to client device 104(2), and so on. At block 414, the events manager is notified of a process event corresponding to the data that is specific to a user agent request. For example, event monitor 212(1) that is specific to a request from client device 104(1) notifies the events manager 220 of a process event corresponding to the data that is specific to client device 104(1), event monitor 212(2) that is specific to a request from client device 104(2) notifies the events manager 220 of a process event corresponding to the data that is specific to client device 104(2), and so on. The method 400 continues at block 408 to receive an additional user agent request from a client device that displays the interactive form for user-interaction.

Figure 5:
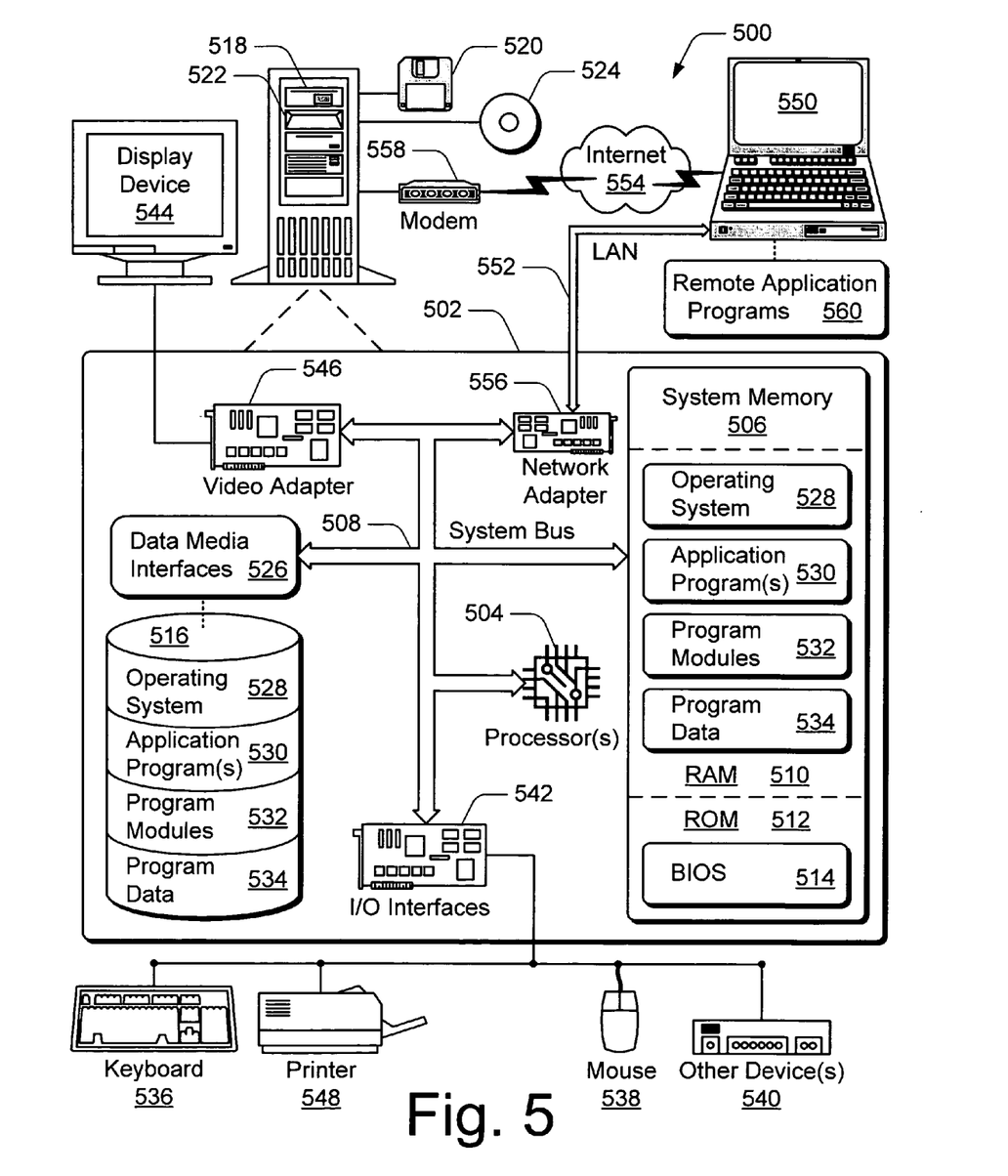
FIG. 5 illustrates exemplary computing systems, devices, and components in an environment that scalable object model can be implemented.

FIG. 5 illustrates an exemplary computing environment 500 within which scalable object model systems and methods, as well as the computing, network, and system architectures described herein, can be either fully or partially implemented. Exemplary computing environment 500 is only one example of a computing system and is not intended to suggest any limitation as to the scope of use or functionality of the architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on RAM 510, ROM 512, hard disk 516, magnetic disk 520, and/or optical disk 524, including by way of example, an operating system 528, one or more application programs 530, other program modules 532, and program data 534. Each of such operating system 528, application program(s) 530, other program modules 532, program data 534, or any combination thereof, may include one or more embodiments of the systems and methods described herein.

Computing device 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 502 via any number of different input devices such as a keyboard 536 and pointing device 538 (e.g., a "mouse"). Other input devices 540 (not shown specifically) may include a microphone, joystick, game pad, controller, satellite dish, serial port, scanner, and/or the like. These and other input devices are connected to the processors 504 via input/output interfaces 542 that are coupled to the system bus 508, but may be connected by other interface and bus structures, such as a parallel port, game port, and/or a universal serial bus (USB).

A display device 544 (or other type of monitor) can be connected to the system bus 508 via an interface, such as a video adapter 546. In addition to the display device 544, other output peripheral devices can include components such as speakers (not shown) and a printer 548 which can be connected to computing device 502 via the input/output interfaces 542.

Computing device 502 can operate in a networked environment using logical connections to one or more remote computers, such as remote computing device 550. By way of example, remote computing device 550 can be a personal computer, portable computer, a server, a router, a network computer, a peer device or other common network node, and the like. The remote computing device 550 is illustrated as a portable computer that can include any number and combination of the different components, elements, and features described herein relative to computing device 502.

Logical connections between computing device 502 and the remote computing device 550 are depicted as a local area network (LAN) 552 and a general wide area network (WAN) 554. Such networking environments are commonplace in offices, enterprise-wide computer networks, intranets, and the Internet. When implemented in a LAN networking environment, the computing device 502 is connected to a local network 552 via a network interface or adapter 556. When implemented in a WAN networking environment, the computing device 502 typically includes a modem 558 or other means for establishing communications over the wide area network 554. The modem 558 can be internal or external to computing device 502, and can be connected to the system bus 508 via the input/output interfaces 542 or other appropriate mechanisms. The illustrated network connections are merely exemplary and other means of establishing communication link(s) between the computing devices 502 and 550 can be utilized.

In a networked environment, such as that illustrated with computing environment 500, program modules depicted relative to the computing device 502, or portions thereof, may be stored in a remote memory storage device. By way of example, remote application programs 560 are maintained with a memory device of remote computing device 550. For purposes of illustration, application programs and other executable program components, such as operating system 528, are illustrated herein as discrete blocks, although it is recognized that such programs and components reside at various times in different storage components of the computing device 502, and are executed by the one or more processors 504 of the computing device 502.

Although embodiments of scalable object model have been described in language specific to structural features and/or methods, it is to be understood that the subject of the appended claims is not necessarily limited to the specific features or methods described. Rather, the specific features and methods are disclosed as exemplary implementations of scalable object model.

The invention claimed is:

1. A method, comprising:

receiving a request for a form from a first client device;

instantiating a single instance of one or more objects as logic code to process data manipulation events associated with the form;

instantiating a single instance of an events manager as logic code through which the one or more objects register to process the data manipulation events associated with the form, the single instance of each of the one or more objects and the events manager being shareable across multiple processing sessions;

processing data specific to the first client device with the single instance of the one or more objects that correspond to the form via a first processor thread;

receiving an additional request for the form from a second client device;

processing additional data specific to the second client device with the single instance of the one or more objects that correspond to the form via a second processor thread such that the one or more objects are shared by the first client device and the second client device to process the data manipulation events associated with the form;

maintaining the data that is specific to the first client device with a first thread local storage; and maintaining the additional data that is specific to the second client device with a second thread local storage.

2. A method as recited in claim 1, further comprising:

processing a second request from the first client device to process the data specific to the first client device;

obtaining the data specific to the first client device from a persisted data store;

storing the data obtained from the persisted data store in a thread local storage corresponding to the second request; and processing the data specific to the first client device with the single instance of the one or more objects that correspond to the form.

3. A method as recited in claim 1, wherein:

the one or more objects and the events manager are instantiated when a session is established;

the single instance of each of the one or more objects and the events manager are maintained for a duration during which multiple requests from one or more additional client devices are processed; and the one or more objects are shared by the one or more additional client devices to process the data manipulation events associated with the form.

4. A method as recited in claim 1, further comprising receiving the request from a first Web browser of the first client device as a request for an HTML form, and receiving the additional request from a second Web browser of the second client device as a request for the HTML form.

5. A method as recited in claim 1, further comprising receiving the request from a first Web browser of the first client device as a request for an HTML form represented by the one or more objects, and receiving the additional request from a second Web browser of the second client device as a request for the HTML form represented by the one or more objects.

6. A method as recited in claim 1, wherein:

the single instance of the one or more objects are instantiated as logic code associated with an HTML form displayed for viewing at the first client device and displayed for viewing at the second client device;

the request is a first user-selectable request to manipulate the data specific to the first client device and associated with the HTML form displayed at the first client device; and the additional request is a second user-selectable request to manipulate the additional data specific to the second client device and associated with the HTML form displayed at the second client device.

7. A method as recited in claim 1, wherein each of the one or more objects and the events manager are instantiated on a side of a processor thread boundary, and wherein each of the first thread local storage and the second thread local storage are instantiated on another side of the processor thread boundary.

8. A scalable object model, comprising:

one or more objects corresponding to an interactive form, the one or more objects configured to process multiple user agent requests which are each processed on a separate processor thread;

an events manager configured to register process events associated with the interactive form;

a session established when a user agent request is received during which a single instance of each of the one or more objects and the events manager are maintained to process the multiple user agent requests such that the one or more objects are shared by the multiple user agent requests, the single instance of each of the one or more objects and the events manager being shareable across multiple processing sessions; and a thread local storage corresponding to a particular processor thread that is associated with the user agent request, the thread local storage configured to maintain data specific to the user agent request.

9. A scalable object model as recited in claim 8, further comprising an event monitor associated with the user agent request and corresponding processor thread, the event monitor configured to notify the events manager of a process event for data that is specific to the user agent request.

10. A scalable object model as recited in claim 8, wherein:

the user agent request is received from a first Web browser of a first client device that displays the interactive form for user-interaction; and one or more additional requests are received from Web browsers of additional client devices that each display the interactive form for user-interaction.

11. A scalable object model as recited in claim 8, wherein:

the interactive form is displayed for viewing at one or more client devices;

the user agent request is a user-initiated request to manipulate data associated with the interactive form displayed at a client device, and the data is specific to a user of the client device; and one or more additional user agent requests are user-initiated requests to manipulate data associated with the interactive form displayed at one or more additional client devices, and the data for each additional request is specific to a user of an additional client device.

12. A scalable object model as recited in claim 8, wherein each of the one or more objects and the events manager are instantiated on a side of a processor thread boundary, and wherein the thread local storage is instantiated on another side of the processor thread boundary.

13. One or more computer readable media comprising computer executable instructions that, when executed, direct a server device to:

instantiate a single instance of one or more objects as logic code for data processing in response to a request from a first client device, the single instance of the one or more objects being shareable across multiple processing sessions;

instantiate a single instance of an events manager as logic code through which the one or more objects register data processing events;

process data specific to the first client device with the single instance of the one or more objects via a first processor thread;

process an additional request from a second client device to process additional data specific to the second client device, the additional request being processed with the single instance of the one or more objects via a second processor thread such that the one or more objects are shared by the first client device and the second client device;

maintain the data that is specific to the first client device with a first thread local storage; and maintain the additional data that is specific to the second client device with a second thread local storage.

14. One or more computer readable media as recited in claim 13, further comprising computer executable instructions that, when executed, direct the server device to:

process a second request from the first client device to process the data that is specific to the first client device;

obtain the data that is specific to the first client device from a persisted data store;

store the data obtained from the persisted data store in a thread local storage corresponding to the second request; and process the data specific to the first client device with the single instance of the one or more objects.

15. One or more computer readable media as recited in claim 13, further comprising computer executable instructions that, when executed, direct the server device to instantiate the single instance of the one or more objects and the single instance of the events manager when a session is established, and maintain the single instance of each of the one or more objects and the events manager for a duration during which multiple requests from one or more additional client devices are processed.

16. One or more computer readable media as recited in claim 13, further comprising computer executable instructions that, when executed, direct the server device to instantiate the single instance of the one or more objects and the single instance of the events manager when a session is established, and maintain the single instance of each of the one or more objects and the events manager for a duration during which multiple requests from one or more additional client devices are processed such that the one or more objects are shared by the one or more additional client devices to process the multiple requests.

17. One or more computer readable media as recited in claim 13, further comprising computer executable instructions that, when executed, direct the server device to receive the request from a first Web browser of the first client device as a request for an HTML form, and receive the additional request from a second Web browser of the second client device as a request for the HTML form.

18. One or more computer readable media as recited in claim 13, further comprising computer executable instructions that, when executed, direct the server device to receive the request from a first Web browser of the first client device as a request for an HTML form represented by the one or more objects, and receive the additional request from a second Web browser of the second client device as a request for the HTML form represented by the one or more objects.

19. One or more computer readable media as recited in claim 13, further comprising computer executable instructions that, when executed, direct the server device to:

instantiate the single instance of the one or more objects as logic code associated with an HTML form displayed for viewing at the first client device and displayed for viewing at the second client device;

receive the request as a first user-selectable request to manipulate the data specific to the first client device and associated with the HTML form displayed at the first client device; and receive the additional request as a second user-selectable request to manipulate the additional data specific to the second client device and associated with the HTML form displayed at the second client device.

20. One or more computer readable media as recited in claim 13, wherein each of the one or more objects and the events manager are instantiated on a side of a processor thread boundary, and wherein each of the first thread local storage and the second thread local storage are instantiated on another side of the processor thread boundary.

* * * * *